B. D. HORTON.

ELECTRICAL SWITCH.

APPLICATION FILED DEC. 13, 1918.

Reissued Aug. 2, 1921.

15,169.

2 SHEETS—SHEET 1.

INVENTOR

Bryson D. Horton

BY Clifford A. Adam his ATTORNEY

B. D. HORTON.

ELECTRICAL SWITCH.

APPLICATION FILED DEC. 13, 1918.

Reissued Aug. 2, 1921.

15,169.

2 SHEETS—SHEET 2.

INVENTOR

Bryson D. Horton

By Clifford A. Adams his ATTORNEY

UNITED STATES PATENT OFFICE.

BRYSON D. HORTON, OF DETROIT, MICHIGAN.

ELECTRICAL SWITCH.

15,169. Specification of Reissued Letters Patent. Reissued Aug. 2, 1921.

Original No. 1,184,454, dated May 23, 1916, Serial No. 809,880, filed January 2, 1914. Application for reissue filed December 13, 1918. Serial No. 267,093.

*To all whom it may concern:*

Be it known that I, BRYSON D. HORTON, a citizen of the United States, residing at Detroit, in the county of Wayne and State of Michigan, have invented certain new and useful Improvements in Electrical Switches, of which the following, taken in connection with the accompanying sheets of drawings, is a full, clear and concise description thereof.

My invention relates more particularly to that class or type of electrical switches, which are commonly referred to as protected or armor-clad, that is—switches in which the live metal or current carrying parts are inclosed within and protected by but insulated from, a metallic housing. The rapidly increasing utilization of electrical power to industrial purposes has correspondingly increased and made greater the element of life hazard. In order to safely and efficiently provide for the proper handling of control of electrical current, this type of armor-clad switch has been devised.

Among the objects of my invention are to provide in a switch of this general type, a mechanism of simplified construction of increased electrical efficiency and one possessing a maximum degree of protection against accidental shock during manipulation and with all a switch, the parts of which may be rendered easily accessible for inspection or repair purposes.

In the accompanying drawings, I have illustrated by way of example, one preferable embodiment of my invention, in which—

Figure 1:
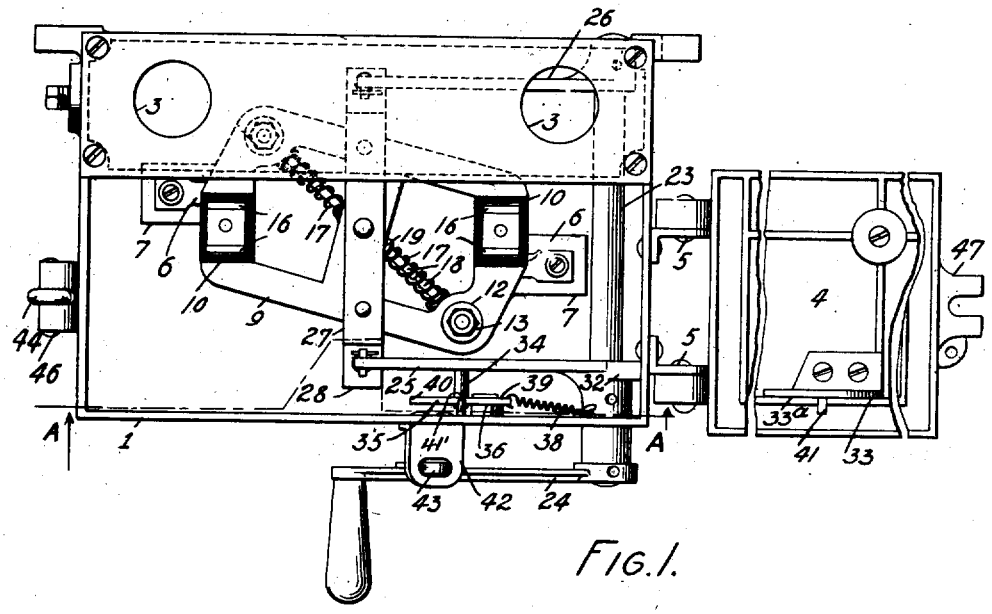
Figure 2:
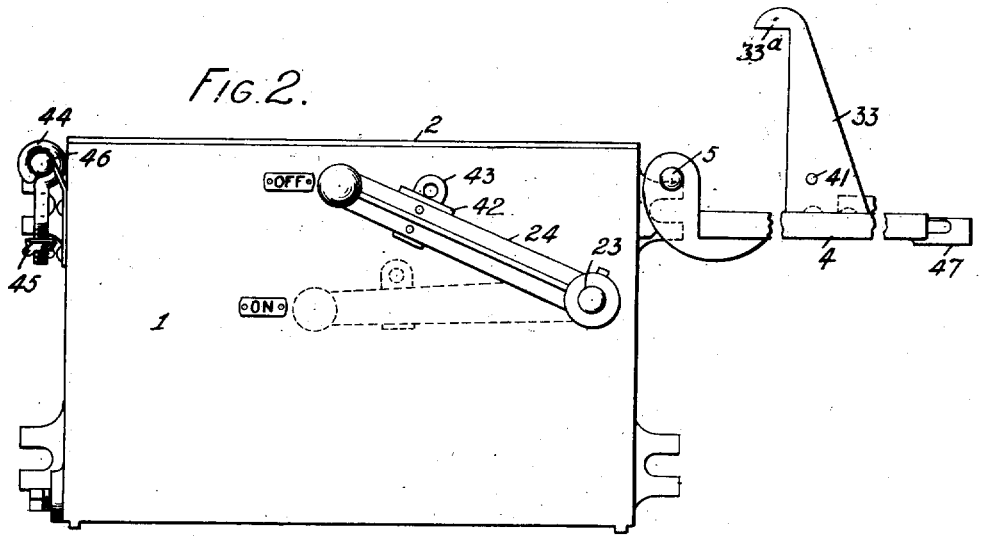
Figure 3:
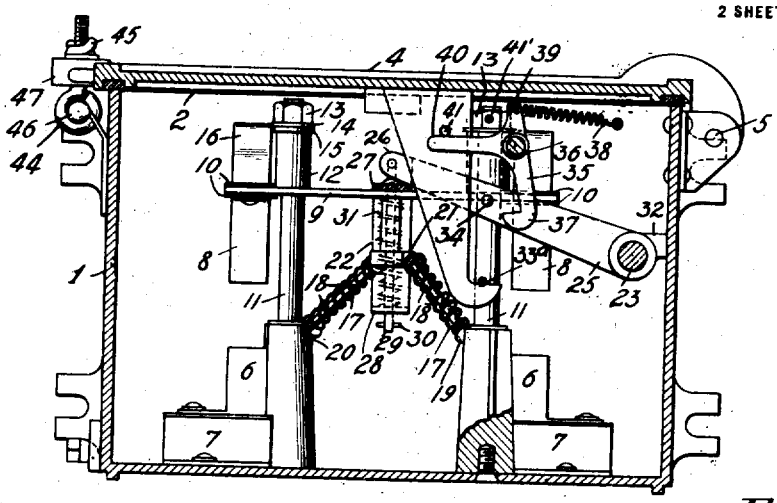
Figure 4:
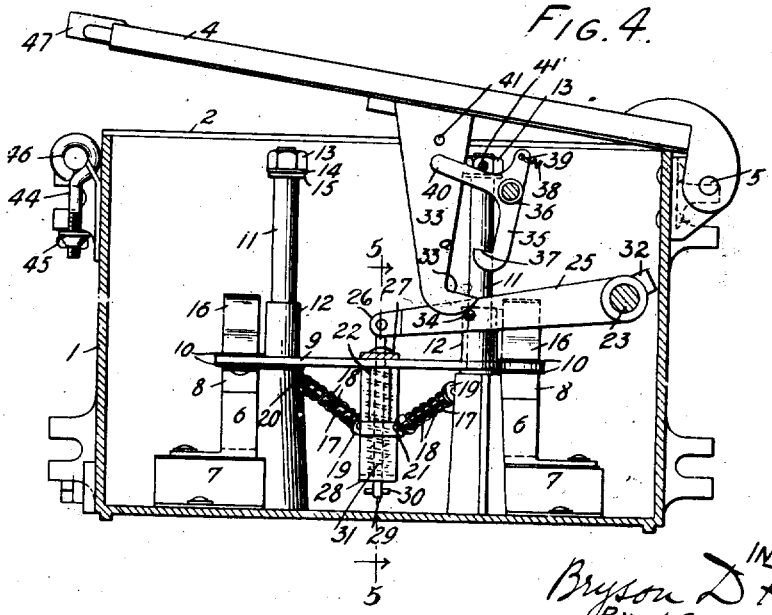

Figure 1 ilustrates a top plan view of the switch with the hinged cover or lid opened, Fig. 2 is a view in side elevation thereof, Fig. 3 is a cross-sectional view taken on broken line A—A of Fig. 1, with the lid, however, in its closed position. Fig. 4 is a similar view with the lid partly raised, but with the switch mechanism in its "on" or contact making position. In practice the relation of parts herein shown is not attained, but may be had by manually releasing the trigger mechanism, as pointed out below.

Figure 5:
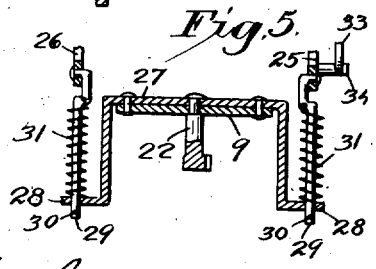

Fig. 5 is a section on the line 5—5 in Fig. 4 showing part of the switch operating mechanism.

As will be observed, all of the stationary and movable switch parts, excepting the operating lever, are mounted within the body portion of the receptacle, thus presenting the same in position when the cover is open to allow the operator thereof to ascertain the condition and operativeness of the parts. Furthermore, it is desirable, where an alternating current of a pressure of 600 volts is handled and in which case the live metal parts are submerged in oil, to position all of the parts within the body of the receptacle so as to avoid the possibility of the oil being carried and thrown by the movement of the movable parts of the switch mechanism, as would be the result if the movable parts were mounted upon the bottom of the cover of the receptacle.

In detail, the body portion of the metal housing is indicated by the numeral 1. To the top of this body portion and inclosing a portion thereof is a removable plate 2 provided with openings or apertures 3 for the accommodation of the wire carrying conduits. The balance of the top opening is closed by a cover 4 suitably hinged at 5. The stationary contacts are of jaw-formation and are indicated at 6. These are mounted upon and insulated from supports 7, which are fast to the bottom of the housing 1. Coöperatively associated with the stationary contacts are the movable contacts 8 of knife-blade formation. These contacts are mounted upon a reciprocating cross-head 9 but insulated therefrom by sheet mica or other insulating material 10. The numeral 11 indicates a pair of guide rods, for the reciprocating cross-head 9, the latter being provided with sleeves 12, which serve as alining and bearing members through which the guide rods reciprocate. Upon the tops of guide rods 11 are positioned limiting stops, which control or limit the upward movement of the cross-head 9 when the movable contacts are thrown to their "off" position. These limiting stops consist of nuts 13, metal washers 14, and leather or flexible washers 15, the latter serving in a measure to cushion the blow or force of the upward spring actuated movement of the movable contact carrying cross-head. Connected with the respective movable contacts 8 are fuse clips 16 for the accommodation of the ends of a suitable fuse (not shown).

It is desirable in switches of this character to provide a mechanism which will assure a quick "make" and "break" action of the switch mechanism. In order to accomplish this, I have in a compact and simplified manner, provided such a mechanism which may conveniently be described as comprising two spiral springs 17 of the compression type, mounted upon a pair of telescopically mounted pins 18, one end of one pin being reduced and having a sliding fit within a bore provided in the opposite pin, thus maintaining perfect alinement of each and also permitting of their reciprocation with respect to each other. The ends of the spring bear upon fixed stops or plates 19 fast to the pins 18. The ends of the telescopic pins 18 are conical or pointed and rest in circular depressions 20 and 21, the former being provided in the enlarged base at the lower extremities of the guide rods 11 and the latter being provided in the extremity of a depending projection 22 carried by the cross-head 9. These springs are put under compression during the movement of the cross-head until the telescoping pins 18 are brought into substantial alinement, during either the "make" or "break" movement of the mechanism. As soon as the telescoping pins 18 move past or out of their dead center or alined position, the stored spring energy is abruptly spent or exerted toward accelerating the movement of the cross-head 9 and knife contacts 8 in one of these two directions of movement.

The telescoping pins 18 assume a horizontal position just as the contacts are about to engage one another, when the pins are moved from the horizontal on the down stroke, the knife-blades 8 enter and move downwardly between the jaws 6 with a quick snappy movement under the influence of this spring tension. Upon the up-stroke, as the knife-blade contacts are breaking connection from the jaw contacts, there is a slight lag in their movement until the telescoping pins 18 move from the horizontal, at which time the expansive force or power of spring 17 causes a quick "break" action between the contacts.

In order to operate the switch, I provide a rock shaft, 23 journaled in the sides of the casing 1. Upon the end of this rock shaft and exterior of the casing is a suitable operating crank 24. The rock shaft is provided with two interior arms 25 and 26, which have operable connection with the cross-head 9. This connection is a yielding connection, and one which serves to accelerate and make still more rapid the "make" or "break" movement of the switch mechanism. I accomplish this by providing a saddle or U-shaped metal piece 27 provided with perforated extensions 28, through which extend connecting links 29, the lower extremities of which are provided with limiting stops in the form of cotter pins 30. The upper ends of these links are connected to the arms 25 and 26. Surrounding the links 29 and fast to the links at one end and the extensions 28 at the other end, are spiral springs 31. In the operation of this yielding connection, the links 29 are adapted to partially move independent of the cross-head 9, the latter moving only when a sufficient amount of power has been applied to either compress or expand the springs 31 to the extent required to impart movement to said cross-head during the "make" or "break" action of the switch. In this spring connection, the operating power is stored and suddenly spent or expended at the time that contact is being made or broken, thus a decisive and quick action is obtained. This stored up energy suddenly applied, supplements the similar spring action imparted by the springs 18, so by this combination of springs acting in the manner specified, increased operating efficiency is obtained. 32 indicates a rearward extension or stop to arm 25, which engages the end of the housing 1 upon the mechanism being thrown to its "off" position, thus preventing the application or transmission of too much strain or power to the switch mechanism during the throw of the switch mechanism to its "off" position, which might otherwise result in derangement or destruction of the parts.

The reduction or minimizing of the element of life hazard in the handling of high potential currents is one of the objects of my present invention and in order to decrease this hazard during the manipulation of the switch, I have provided an automatic locking means which prevents the cover from being opened and access had to the interior live metal parts when the switch is in its "on" position, in which position the current is flowing. This I accomplish by providing a depending hook member 33 supported by the bottom of the hinged cover 4, the foot 33ª of this depending member coöperates with a pin 34 carried by the arm 25. The oscillatory motion of this pin during the oscillatory movement of the rock shaft and arm 25 moves it into and out of its engaging position with the foot 33ª when the mechanism is thrown "on" or "off" as the case might be. When the switch mechanism is "off," the member 33 is free of the pin 34 and the cover may be opened but in this position, the mechanism is locked and cannot be operated without manually releasing it as will be presently explained. When the cover is closed, the switch mechanism may be freely operated. Therefore, as explained, when the switch mechanism is in its "on" position, the pin 34 is above and engages the foot 33ª, preventing the raising of the cover and when it is desired to gain access to the interior of the receptacle, the operating crank or handle 24 must first be operated to throw the switch to its "off" position, which results in throwing the pin 34 out of engagement with the hook or foot 33ª permitting the cover to be opened. Now, when the mechanism is in this position, that is—the "off" position with the cover open, I provide against accidental shock by preventing the thoughtless manipulation of the switch when the cover is open and the metal parts exposed and accomplish this by locking the mechanism in its "off" position automatically. I mount a trigger mechanism upon the inside wall of the casing, which trigger mechanism coöperates and engages with the pin 34 when the latter moves upwardly during the operation of the switch and thus prevents the switch mechanism from being thrown to its "on" position, while the cover is open. This trigger mechanism consists of a member 35 journaled at 36 to the side of the casing. This member is provided with a foot or hook 37, which coöperates with the pin 34 as explained, when the cover is opened thus preventing the mechanism from being operated. This trigger is held in this engaging position by a spring 38, one end of which is fast to the side of the casing, while the opposite end is fast to the rearwardly extending foot 39. In order to close the switch, it is necessary to release the trigger by throwing the foot 37 out of engagement with the pin 34. This may be accomplished manually, should it be desired to manipulate the switch for inspection purposes by the operator, depressing the trigger or extending finger piece 40, thus releasing the mechanism and permitting the operating handle to be moved to throw the switch. Should this be done, it becomes impossible in this position to close the cover of the receptacle, as the foot 33ª of the member 33 is in engaging position with the pin 34 as shown in Fig. 4. This necessitates the throwing of the switch mechanism into its "off" position to permit of the closing of the cover, in which position the mechanism becomes automatically locked again, as has been explained. Small pin 41′ carried by the casing 1 engages the finger piece 40 on the member 35, and acts as a stop in coöperation with the spring 38.

In the event of an attempt to open the cover 4 when the switch mechanism is closed, the foot 33ª of the hook member 33 will engage with the lower side of the pin 34 and exert a turning movement of the arm 25 about the shaft 23 thereby opening the switch in the same fashion as though the handle 24 were operated.

Now, in order to release the mechanism so that it can be thrown into its "on" position when the cover is closed, the depending hook 33 is provided with a pin 41, which engages the finger piece 40 on its downward movement into cover-closing position. This oscillates or swings the trigger mechanism throwing or swinging the foot 35 out from engagement with the pin 34 as shown in Fig. 3, thus permitting the switch mechanism to be freely operated when the cover is closed. In order to provide for a convenient locking of the mechanism in its "off" position, I provide a perforated extension 42 fast to the exterior side of the casing, which is provided with an aperture through which a similar perforated extension 43 may project. Through this latter perforated extension 43 may be inserted the bow of a suitable padlock, thus providing for the positive locking of the mechanism in its "off" position.

In order to maintain the cover in its closed position, I have provided a convenient fastening means consisting of an eye-screw 44 and coöperating wing nut 45, the eye-screw 44 being mounted upon a bearing 46 carried by the body of the casing and said eye-screw and wing-nut coöperating with the slotted lug 47 extending from the lid to hold and maintain the latter in its closed position.

While I have described one preferable embodiment of my invention, I do not wish to be understood as limiting myself to the precise structural details shown, as the same may be varied or changed without departing from the spirit or scope of my invention, as defined in the appended claims.

Having thus described my invention what I claim as new herein and desire to secure by Letters Patent is:

1. In an iron-clad switch of the character described, a quick make and break mechanism, including a rock shaft, a pair of arms mounted thereon, a bridge piece provided with abutments, resiliently attached to the outer ends of the arms, guide rods provided with abutments, a pair of telescoping rods interposed between the abutments of the guide rods and bridge piece and helical springs mounted upon the telescoping rods.

2. In a switch of the character described, the combination with a metallic housing provided with a hinged cover, a switch mechanism mounted entirely within the body portion of the housing, said switch mechanism comprising a plurality of stationary and movable contacts, said movable contacts being arranged for vertical reciprocation, a rock shaft mounted in the sides of the casing, a pair of arms carried by the rock shaft and having a yielding operative connection with the movable contacts, an operating crank exterior of the casing connected with said rock shaft to provide for the exterior manipulation of the switch mechanism, coöperative means carried by the switch mechanism and the cover of the receptacle for preventing the opening of the cover when the switch mechanism is in its "on" position said means including a hook extension carried by the cover and a coöperating stop carried by one of the arms in position to engage therewith.

3. In a switch of the character described, the combination of a metallic housing provided with a hinged lid, a switch mechanism comprising a plurality of stationary and coöperating movable contacts mounted within the body of said housing, a cross-head carrying said movable contacts, guide rods coöperating with said cross-head and fixedly mounted upon the base of the housing, means for causing the contact carrying cross-head to reciprocate on said guide rods, means for accelerating the movement of said cross-head during the "make" and "break" action of the contacts, said means including a plurality of spiral springs, coöperating with the cross-head and guide rods, said parts being so arranged that said spiral springs will be put under a compression tension during a partial operation of the switch mechanism, said spring tension thereafter being exerted during the further operation of the switch mechanism to effect a quick "make" or "break" between the contacts, a rock shaft journaled in the sides of the casing, said rock shaft having a yielding connection with the cross-head, said yielding connection including a plurality of spiral springs adapted to be put under spring tension during the operation of the switch prior to the "make" or "break" movements of the contacts, said spring tension being a compressive spring tension upon the "make" operation and an expansive spring tension on the "break" operation, in both operations supplementing the spring power of the first-mentioned spring to accelerate the movement thereof.

4. In a switch of the character described, the combination of a metallic housing provided with a hinged cover, stationary contacts mounted within and upon the bace of said housing coöperating movable contacts reciprocally mounted within the body of the housing, means comprising spiral springs adapted to accelerate the movement of said movable contacts, a rock shaft provided with a plurality of arms having yielding connection with said movable contacts and adapted to coöperate with and impart stored spring power to "make" or "break" the connection between said contacts, a locking mechanism mounted upon the side of the body of the housing coöperating with one of the rock arms for locking the movable contacts in their "off" position, said locking mechanism adapted to be manually operated to release said rock arm so that the movable contacts may be thrown into their "on" position.

5. In a switch of the character described, the combination of a metallic housing provided with a hinged cover, stationary contacts mounted within and upon the base of said housing cooperating movable contacts reciprocally mounted within the body of the housing, means comprising spiral springs adapted to accelerate the movement of said movable contacts, a rock shaft provided with a plurality of arms having yielding connection with said movable contacts and adapted to coöperate with and impart stored spring power to "make" or "break" the connection between said contacts, a locking mechanism mounted upon the side of the body of the housing coöperating with one of the rock arms for locking the movable contacts in their "off" position, said locking mechanism adapted to be manually operated to release said rock arm so that the movable contacts may be thrown into their "on" position, and means carried by the cover for engaging said locking means and adapted to release the latter when the cover is closed to permit of the exterior manipulation of the switch.

6. In a switch of the character described, the combination of a casing provided with a hinged cover, a switch mechanism therein, including a rock shaft, a rock arm, a depending extension carried by the cover and cooperatively associated with the rock arm, a trigger mechanism mounted in the casing and having operable connection with both depending extension and rock arm, whereby the movement of said rock arm will be prevented when the cover is open and whereby the opening of said cover will be prevented while the rock arm holds the switch mechanism in closed position.

7. In a switch of the character described, the combination of a casing provided with a hinged cover, a switch mechanism therein, a depending hook extension carried by the cover, a rock arm mounted in the side of the casing and operably associated with the switch mechanism, a projection carried by said rock arm and adapted to engage the hook extension to prevent the opening of the cover when the switch is in "on" position, a trigger mechanism mounted in the side of the casing and having a hook extension adapted to engage the projection of the rock arm when the cover is open to prevent the manipulation of the switch mechanism, said trigger being provided with a projection adapted to coöperate with the hook extension of the trigger and move it out of position to permit the free manipulation of the rock arm to make or break the circuit when the cover is closed.

8. In combination a box having a movable cover, a switch in the box including a movable switch element, a switch operating handle disposed externally of the box, a stop for locking the switch handle in the "off" position when the cover is open, a member on the cover for retracting said stop when the cover is closed to thereby enable free operation of the handle when the cover is closed, means for automatically projecting the stop into holding position as the cover is opened and means on the cover for throwing the handle to the "off" position as the cover is opened.

9. In a switch construction, switch mechanism including a movable switch member, a box for said parts including a movable cover, an operating device for the movable switch element including a handle located externally of the box, means for locking said switch handle in the position in which the switch is open when the box cover is open, said locking means being movable to the unlocking position by closing the cover, and means connected to said cover and in a position to engage a portion of said operating device to shift the same to "off" position in the opening movement of the cover.

10. In a device of the character described the combination with a casing comprising a bottom, sides and a cover hinged to said sides and adapted to close the box, said cover being provided with an extension projecting into said box when the cover is closed, a switch mounted within the casing and operating means for said switch comprising a rock shaft journaled in the side of said casing and provided with a handle external of the casing, said rock shaft being provided with an arm and a stop on the arm; of a bell crank lever mounted on the inner side of the switch casing, one arm of said lever having means to coöperate with the stop to hold the switch open when the cover is open, and a spring to bias said lever in a direction to insure such coöperation, the other end of said lever being engageable by the extension on the cover when the cover is closed to move the lever against the spring biasing and insure disengagement of the stop and said means, whereby the switch may then be freely operated.

11. In combination a switch including a movable switch element, a box inclosing said switch, operating means for said switch comprising a shaft journaled in the side of the box and having an operating connection with the movable switch element, a handle on the outside of the box and connected to said shaft, said means also having a member providing one part of an interlocking device, a depressible stop within the casing coöperative to provide the other part of the interlocking device, said box having a movable cover, a portion thereof engaging the depressible stop in the closed position of the cover to hold said stop retracted out of the path of movement of said member when the switch is closed, said member and depressible stop coöperating to normally lock the switch open when the cover is open.

12. A device as defined in claim 11 wherein the depressible stop is accessible for manipulation, when the cover is open, to disconnect the interlock, whereby the switch may be closed while the cover remains open.

13. A device as defined in claim 11 wherein the cover and switch mechanism are provided with coöperative interlocking means to hold said cover closed while the switch is closed.

14. A device as defined in claim 11 wherein the depressible stop is accessible for manipulation, when the cover is open, to disconnect the interlock, whereby the switch may be closed while the cover remains open, and the cover and switch mechanism are provided with coöperative interlocking means to hold said cover closed while the switch is closed, said last mentioned means prohibiting the closing of the cover after the depressible stop has been manipulated and the switch closed as described.

15. In an inclosed electrical switch in combination, movable contacts, coöperating means for the movable contacts, a housing comprising a box having sides and a movable cover with a projection, and a trigger mechanism between the cover and the operating means, said mechanism comprising a trigger pivoted to said sides, a spring connected to said trigger and side for influencing the trigger, a first and second arm on said trigger, said projection engaging the first arm when the cover is closed, said trigger being moved by said spring, when the cover is opened, said means being adapted to interengage with said second arm when the trigger is so moved to restrict the movement of the operating means.

16. A trigger mechanism for an electrical switch comprising a pivoted member having three arms, one arm having a flat surface, a second arm having a hooked extension, and a spring connected to the third arm.

17. The combination of a casing having an opening and swinging closure means therefor, an electric switch in said casing, operating means for said switch including a member which interposes directly in the path of swing of said closure means except when the switch is in open position, a yieldable connection between said operating means and said switch whereby the latter is moved with a snap action, and means for locking the switch open while the closure means remain open.

18. In an inclosed switch having a casing provided with a cover, switch-operating means, a member pivoted on said casing independently of said switch operating means to interlock said switch in the off position when said cover is open, a member on said cover to directly engage and unlock said pivoted interlock when said cover is closed, and means associated with said switch operating means to lock said cover closed while said switch remains closed.

19. In an inclosed switch having a casing provided with a cover, switch-operating means embodying an oscillating portion, a member pivoted on said casing independently of said switch operating means to interlock said switch in the off position when said cover is open, a member on said cover to unlock said interlock when said cover is closed, and means on the oscillating portion of said switch operating means to lock said cover closed while said switch remains closed.

20. In an inclosed switch having a casing provided with a cover, switch operating means embodying an oscillating portion, a member pivoted on said casing independently of said switch operating means to interlock said switch in the off position when said cover is open, a member on said cover to unlock said interlock when said cover is closed, and said oscillating portion of said switch operating means comprising a stop which is movable, upon the closure of said switch, to lock said cover closed while said switch remains closed.

21. In an inclosed switch having a casing provided with a cover, switch operating mechanism, a member pivoted on said casing independently of said switch operating mechanism, means associated with said switch operating mechanism to interlock with said pivoted member to prevent the closing of the switch when said cover is open, and a member comprising means to unlock said interlock upon the closure of said cover, said first-named means being moved when the cover and switch are closed to lock said last named member to prevent the opening of said cover while said switch is closed.

22. In an inclosed switch having a casing provided with a cover, switch operating means, a member pivoted on said casing independently of said switch operating means to lock said switch operating means in the off position when said cover is open, a member on said cover adapted to engage said pivoted member when said cover is closed to release said switch operating means from its locked position, and means associated with said switch-operating means and so moved when the switch and cover are closed that said member on said cover operates to prevent the opening of said cover while said switch is closed.

23. In an inclosed switch having a casing provided with a cover, switch operating means, means depending from said cover and adapted to be engaged by a portion of said switch operating means to prevent the opening of the cover while said switch remains closed, a member pivoted within the casing for holding the switch in open position while said cover remains open, means for normally biasing said pivoted member into holding engagement with the switch operating means, and means also attached to said cover for moving said pivoted member against said biasing action to free said switch operating means when the cover is closed.

24. In an inclosed switch having a casing provided with a cover, switch operating means, a member depending from said cover and adapted to be so moved, when the cover is closed and thereafter the switch is closed, that it is held by said switch operating means to prevent the opening of the cover while said switch remains closed, a member pivoted within the casing for holding the switch in open position while said cover remains open, said switch operating means comprising a part which may be engaged by said pivoted member, means for normally biasing said pivoted member into holding engagement with the switch operating means, and means also attached to said cover for moving said pivoted member against said biasing action to free said switch operating means when the cover is closed.

25. In an inclosed switch having a casing provided with a hinged cover, fixed contacts, movable contacts, switch operating means for said movable contacts, an engaging member on said switch operating means, a member attached to said cover at a point away from the cover hinge and adapted to contact directly with said engaging member to prevent the opening of the cover when the switch is closed but so shaped that the switch may be freely moved to "on" and "off" positions while the said cover is closed, and means to engage the engageable member to prevent the closing of the switch while the cover is open.

26. In an inclosed switch having a casing provided with a cover, fixed contacts, movable contacts, rock arms for actuating the movable contacts, a member depending substantially perpendicularly from said cover, an interlocking member movable with said arms and adapted to be projected into the linear path of movement of said cover member when the switch is closed whereby said cover cannot be moved to open position while the switch remains closed, and means projectable into the return path of said rock arm and adapted to directly engage a portion of said arm to prevent the closing of the switch while the cover remains open, said last named means being moved to one side and out of the path of said arm as the cover is closed.

27. In an inclosed switch having a casing provided with a cover, switch operating means embodying an engageable portion, and a member on said cover adapted, through effective instrumentalities, to engage said switch operating means when the switch is closed whereby the cover cannot be opened, said engagement being disabled when the switch is opened and said switch operating means being directly engaged, in the open position of the cover, to prevent the closure of the switch.

28. In an inclosed switch having a casing provided with a cover, switch operating means comprising an arm, a pin on said arm, a member attached to said cover and having a portion adapted to be engaged by said pin when said switch is closed to prevent the opening of the cover, said pin being moved from the path of said member when the switch is opened whereby the cover may be opened, and means to engage said pin when said cover and switch are open to prevent the closing of the switch.

BRYSON D. HORTON.